C. B. MORSE.
Device for Making Spinning Ring Blanks.

No. 230,888.  Patented Aug. 10, 1880.

WITNESSES.
Wilmarth H. Thurston
Walton H. Barton

INVENTOR.
Cyrus B. Morse

UNITED STATES PATENT OFFICE.

CYRUS B. MORSE, OF RHINEBECK, NEW YORK, ASSIGNOR OF ONE-HALF OF HIS RIGHT TO STEPHEN A. JENKS, OF PAWTUCKET, RHODE ISLAND.

DEVICE FOR MAKING SPINNING-RING BLANKS.

SPECIFICATION forming part of Letters Patent No. 230,888, dated August 10, 1880.

Application filed October 9, 1879.

*To all whom it may concern:*

Be it known that I, CYRUS B. MORSE, of Rhinebeck, Dutchess county, State of New York, have invented a new and useful Improvement in the Process and Devices for Making Blanks for Spinning-Rings; and I do hereby declare that the following specification, taken in connection with the accompanying drawings, forming a part of the same, is a full, clear, and exact description thereof.

My invention relates to a novel method and to novel means for forming blanks for spinning-rings of that particular class which are socketed in the ring-rails of spinning-machines, in contradistinction to that class of less widely used rings having flanged bases for resting flatly upon the upper surfaces of ring-rails.

Figure 5:

Socketed ring-blanks have always heretofore been formed by welding and forging operations, and the disadvantages thereof, as compared with my novel mode of operation, are as follows:

Heretofore blanks of this class have been formed from a strip of metal of proper thickness and length, heated, bent around the horn of an anvil, and welded, the result being illustrated in Figure 5. For finishing such a blank the lower exterior portion is extensively turned to develop, not only a shoulder for resting-contact with the ring-rail surface, but also a good fit for the socket.

One object of my invention is to reduce the finishing operation to a minimum of cost, and, incident thereto, to economize in the expensive steel of which such rings are composed. In welding these steel blanks many are injured by being burned, resulting in their total loss, and oftentimes this condition is not observable until the finishing operation has been nearly completed, involving additional loss; and the same is true of imperfect welds from causes other than overheating.

Another object of my invention is to wholly obviate welding in the manufacture of this class of rings, thereby obviating all liabilities of loss incident thereto.

The high degree of heat incident to perfect welding necessarily leaves the metal in a more or less expanded or open condition, and although it is subsequently hardened by tempering, it can never afford so fine a surface finish on its traveler-race as if the metal had not been so highly heated, and however carefully the welding may be done the density of the metal at the weld-joint varies as compared with other portions of the ring, rendering the ring liable to an unequal wear of the race by the traveler.

Another object of my invention is to attain in this class of rings a practically uniform degree of density throughout their circumference, and especially at the upper or race portions thereof.

For the attainment of these several ends I form a blank for a socketed spinning-ring from an annulus of suitable sheet metal by the method and means hereinafter fully described, whereby said annulus of rolled metal is drawn, swaged, and transformed into a tubular structure or blank which has an exterior annular shoulder for resting upon the ring-rail, a condensed swaged thickened upper portion, at the edge of which the race is thereafter developed, and a shank below the shoulder, which requires a minimum of finishing for fitting it to its socket in the rail.

Heretofore sheet metal has been employed in the manufacture of blanks for spinning-rings having flanged bases for resting flatly upon the tops of rails, before herein referred to as the class of blanks to which my invention does not relate. Swaging and forming dies have heretofore been used in forming flanged blanks, and I employ dies of a novel character for swaging and forming. The former methods differ from mine as follows: For making the flanged ring-blanks the sheet metal is in part left in nearly its normal condition, so as to constitute a flange at the base, to afford a resting-surface for contact with the rail, whereas in making the socketed blank I wholly transform the sheet metal into a tubular structure and thicken a portion of the metal by swaging to form the annular shoulder which affords the resting surface. For making the flanged blank a disk of metal has always been employed, whereas to make the shouldered blank an annulus of sheet metal is required by me. In making the flanged blank a portion of the disk always remains in practically the same condition, whereas in making my shouldered blank the entire annulus, occupying originally a plane at right angles to the axis of its central opening, is changed into a ring with sides parallel with said axis. In making flanged blanks a swaging operation has heretofore been involved only in forming the race portion of the ring; but in making the shouldered blank a swaging operation is involved for developing the shoulder.

To more particularly describe my invention I will refer to the accompanying drawings, in which—

Figure 1:
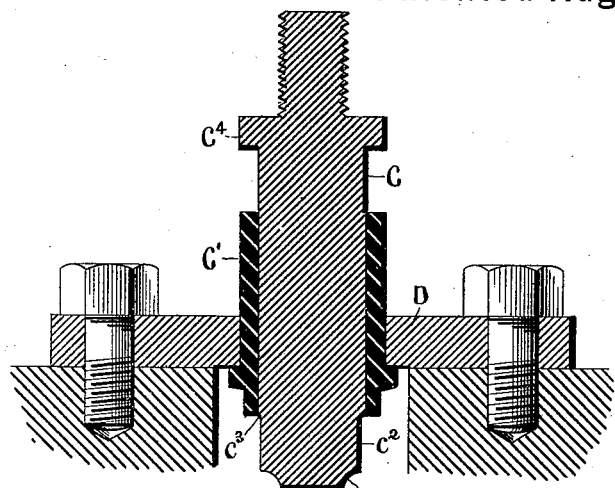
Figure 2:
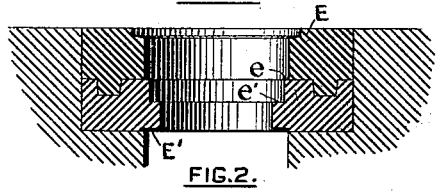
Figure 3:
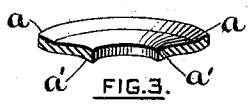
Figure 4:
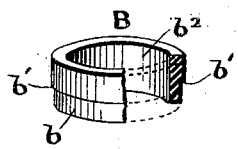
Figure 6:
Figure 7:
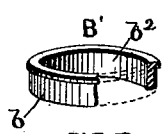

Fig. 1 represents a vertical section of the plungers employed by me in connection with dies shown in vertical section in Fig. 2. Fig. 3 is a sectional perspective view of the disk or annulus from which the blanks are made. Fig. 4 represents, in partial section, a perspective view of a finished blank. Fig. 5 shows, in partial section, a perspective view of the common forged blank. Fig. 6 is a sectional perspective view of a disk or annulus from which another style of blank is made; and Fig. 7 shows, in perspective, said style of blank in partial section.

To carry out and successfully practice my invention there is required a plain annulus of flat metal, or an annulus such as is shown at Fig. 3, having oppositely-beveled portions $a$ $a'$, or an annulus such as is shown at Fig. 6, having a single beveled portion, $a'$, a compound plunger of the construction substantially as hereinafter specified, and a die or mold of the proper form to give to the exterior of the ring-blank the shape required to adapt it to be applied to the ring-rail of a spinning-frame.

The result of the action of the plunger, hereinafter described, in combination with the die when mounted in a suitable power-press upon the annular disk of metal mentioned, is to swage it into the form shown at Fig. 4 or at Fig. 7, and at a single operation a ring-blank, B or B', is produced having the periphery of a true circle, $b$, Fig. 4, a square-edged seat or shoulder, $b'$, and an interior surface, $b^2$, in the form of a true circle. To convert a blank so made into a finished spinning-ring it is only necessary to face the top edge in a lathe, cut the races for the traveler, and ream the bore, all of which can be done in much less time and with much greater economy of material than would be required to convert the commonly-used forged blank into a finished ring.

When the proper quality of stock is used the percentage of loss from imperfect blanks is very small, the economy of the process of forming the blank is very great as compared with the cost involved in the forging process, and the article, as a whole, is superior for the uses for which it is designed.

Referring to Fig. 1 of the drawings, C represents a plunger which is constructed so as to be secured to the vertically-reciprocating slide of a suitable power-press. C' is an annular plunger, arranged as a sleeve around the central plunger, C, and is capable of sliding in bearings in the yoke D. The plungers C and C' compose the two members of one compound plunger. Each member performs a separate office in the process of swaging a ring-blank, but both members, during a portion of the process, move together as one structure. In combination with the compound plunger C C', a die suitable for giving the proper shape to the exterior of the ring-blank is employed, and one adapted for the formation of a ring-blank such as is represented at Fig. 4 is shown at Fig. 2.

The plunger C operates as a drawing-plunger in connection with the die E, which is internally proportioned to afford an annular space between it and the plunger, into which the flat disk is drawn, thereby converting it into a tubular structure, the lower end of which then rests firmly upon the annular recess, affording the shoulder $e'$ of die E'; and thereafter this plunger further operates as an internal support to said structure, while the forming or swaging plunger C' operates to develop the resting-shoulder on the blank by forcing the metal into the recess, affording the shoulder $e$ above the upper inner edge of die E'.

The die E E', although constructed in two parts, is nevertheless, when considered as a whole, a molding-die proportioned internally to provide for the drawing operation, and also internally recessed to co-operate with the swaging or forming plunger.

In consequence of the fact that a substantially flat annulus of metal, Figs. 3 and 6, is to be formed into a ring-blank by the process of drawing and swaging between dies, it becomes necessary to give such a form to the end of the plunger C that the plunger will not, in acting upon the metal, cut a ring from the center of the annulus, but that it shall force the metal into the mold or die. Accordingly, the end $c$ of the plunger C is reduced in diameter, and is furnished with a concave drawing-shoulder, $c'$, the effect of which is, as the plunger C enters the die E, it enlarges the inner circle of the annulus and forces the metal downward and outward against the inner walls of the die.

For the purpose of making the interior of the ring-blank as smooth as possible and preventing the blank from hugging the side of the plunger and sticking thereto, so as to interfere with its being readily stripped from the plunger, the central plunger, C, is provided with a cutting-shoulder, $c^3$, the office of which is to trim out the interior of the blank before its full formation has been completed.

It being now understood that a compound plunger, C C', constructed substantially as described, is employed in combination with suitable dies, as shown at Fig. 2, to convert an annular disk, as at Fig. 3, into the ring-blank, shown at Fig. 4, the operation of the devices employed to accomplish my improvement in the process of manufacture is as follows:

An annulus of metal, which may be flat or which may be beveled, as shown at Figs. 3 and 6, respectively, is placed over the die E E', Fig. 2. In case a heavy ring is to be made requiring a thick annulus, it is better to prepare the annulus by a previous simple swaging operation between suitable dies, so that it will have a preliminary bend or disk shape given to it, as shown at Fig. 3 or at Fig. 6, and which will facilitate the easy action of the plungers and dies shown at Figs. and 1 2. The plunger C descends, and forcing the annulus or blank into the die shapes it in the first instance into the general form of a hoop. The plunger continues its movement, which enables the cutting-shoulder $c^3$ on the plunger to shave the interior of such hoop. It now only remains to make true the top and bottom edges and form fully the ring-rail shoulder, or seat $b'$. This is effected by the sleeve member C' of the compound plunger, which obtains its movement from the engagement of the collar $c^4$ on the still moving plunger C with such sleeve member, and the two members now moving as one device, the ring-blank is completely formed, the ring-rail seat being shaped by the shoulders $e\ e'$ in the die. When the plunger ascends the completed ring-blank is stripped from the member C by the edge of the sleeve member C', because the sleeve comes to rest when the flange $c^5$ thereon brings up against the under side of the yoke D, the member C continuing its upward movement.

In performing the operation above described it is usual to heat the annulus; but if the metal be sufficiently ductile and of fine grain, the operation can be performed with a powerful press upon the blank while in a cold state.

The die E E' may be a solid die or made from one piece of metal; but I prefer to make it in two parts, as shown in the drawings, Fig. 2. Each of the two members has a cylindrical interior; but the lower member, E', is of smaller diameter than the upper member, E. When the two members are arranged in the press, as shown at Fig. 2, with their axes coinciding, the edge $e$ of the lower member, E', forms an interior shoulder for the formation of the flange or seat which supports the ring in the ring-rail of the spinning-frame. This shoulder sustains the severest wear in the manufacture of ring-blanks by my described method; and my object in making the parts separable is to enable this member of the compound die to be cheaply supplied when it has become too much worn for use.

In the foregoing description the formation of the blank B, Fig. 4, has only been considered; but it is obvious that a blank, B', of the style shown in Fig. 7, can be made by the same process and devices, the only necessary change being in the die, which would be practically like the portion E of the compound die E E'.

Considered as tools for forming spinning-ring blanks from sheet metal, the plungers and dies, constructed and operating as described, are novel in their operation in that the drawing and swaging operations are practically simultaneous, they being accomplished by a single downward movement of the compound plunger, and also in that they are the first tools whereby an exterior annular shoulder on a spinning-ring blank can be developed by a swaging operation, and also in that a practically flat annulus can therewith be wholly changed in form and converted into a shouldered blank.

Having described my invention, what I claim, and desire to secure by Letters Patent, is—

1. For drawing and swaging annular blanks for spinning-rings, the combination, substantially as hereinbefore described, of the plunger C, provided with the drawing-edge $c'$, the forming-plunger C', arranged to operate on the blank after the drawing-shoulder $c'$ of plunger C has operated, and the molding-die, which is proportioned internally to provide for the drawing operation, and also internally recessed to co-operate with the forming-plunger, as set forth.

2. The combination, substantially as hereinbefore described, of the compound drawing and forming plunger C C', having on the drawing member C a cutting-shoulder, $c^3$, which shaves the interior of the spinning-ring longitudinally, and a molding-die proportioned and recessed to co-operate with the compound plunger in the drawing, forming, and internal shaving operation.

3. The combination, substantially as hereinbefore described, of the compound plunger having drawing and shaving shoulders $c'\ c^3$, with a suitable molding-die for co-operating therewith, as specified.

CYRUS B. MORSE.

Witnesses:
WILMARTH H. THURSTON,
MILTON H. BARTON.